July 29, 1969  V. E. DUDLEY  3,458,045
CENTRIFUGAL PELLET DRIER
Filed Aug. 26, 1966  4 Sheets-Sheet 1
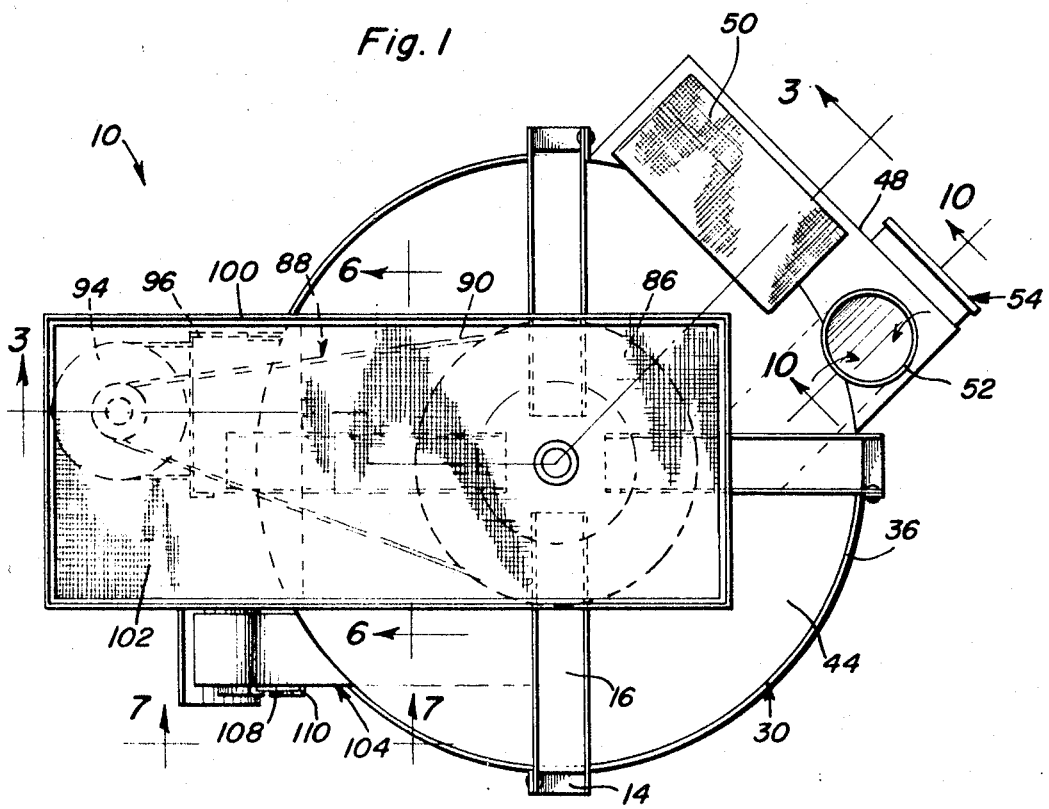
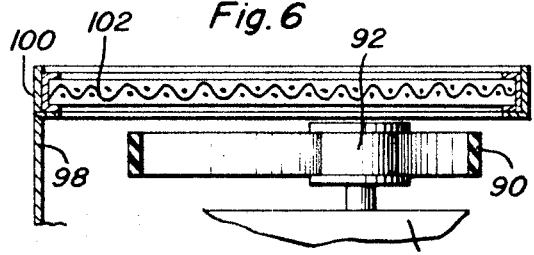
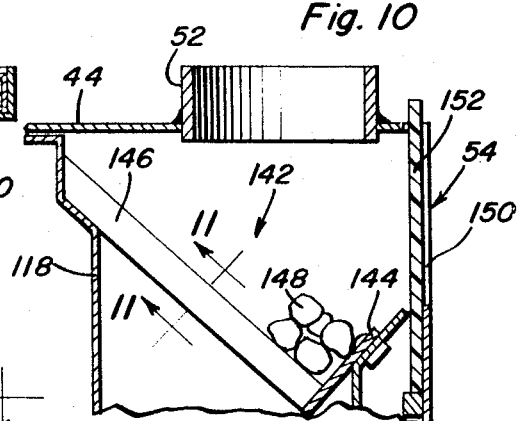
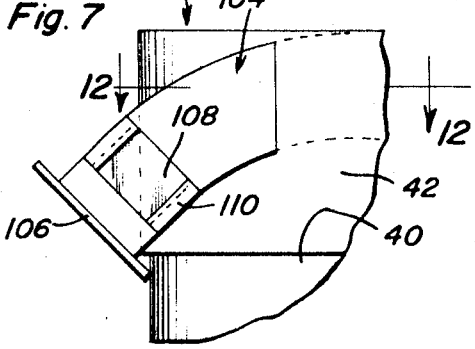
Vernon E. Dudley
INVENTOR.

July 29, 1969 V. E. DUDLEY 3,458,045
CENTRIFUGAL PELLET DRIER
Filed Aug. 26, 1966 4 Sheets-Sheet 2
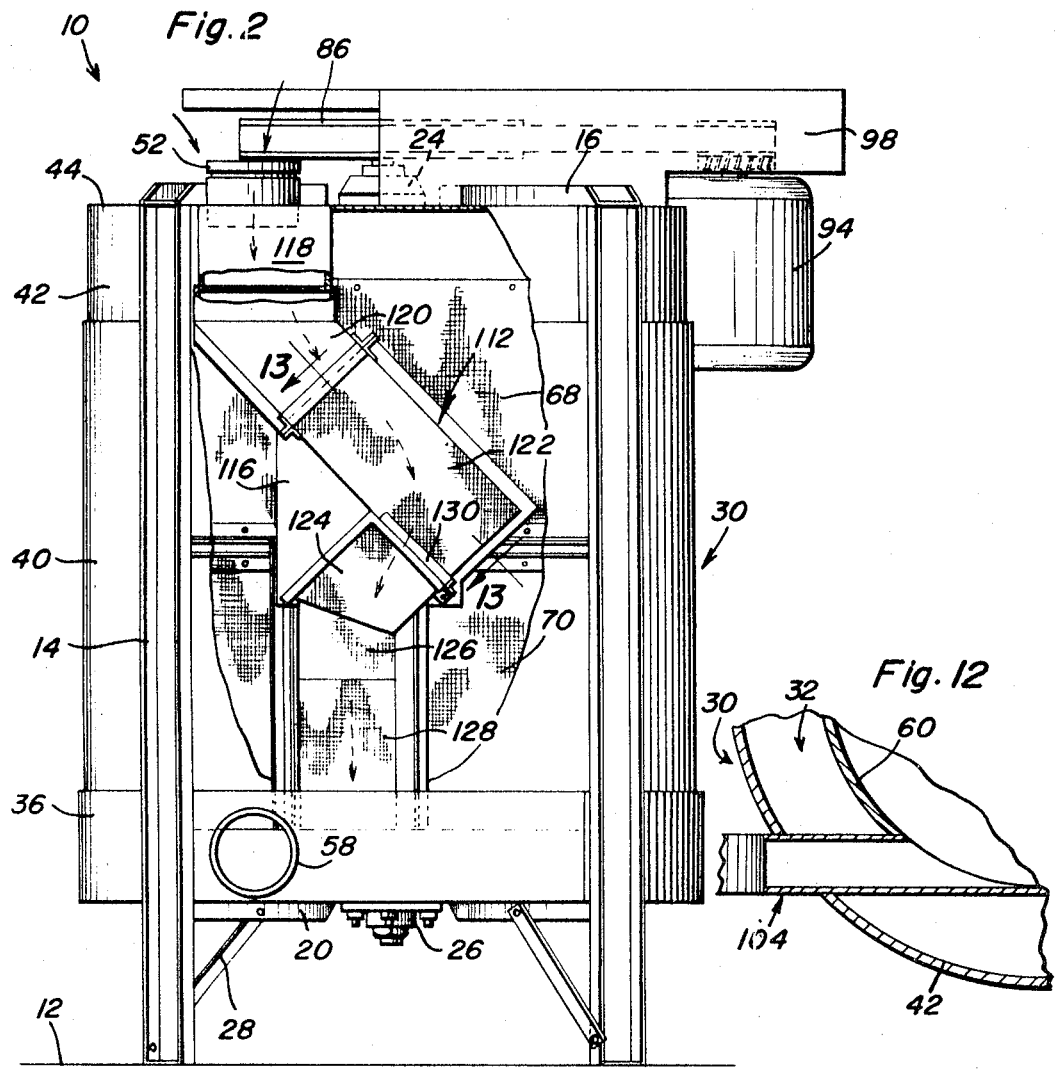
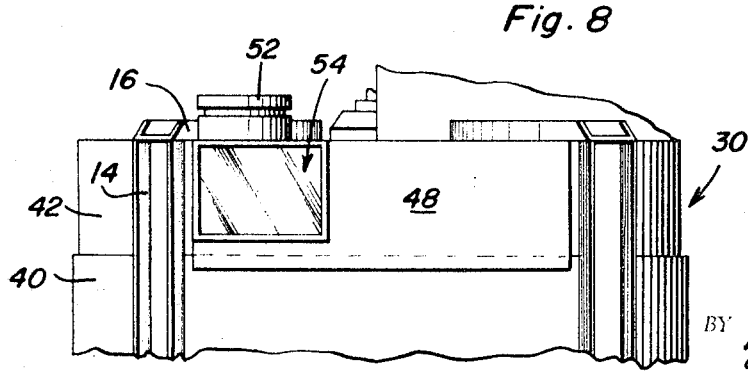
Vernon E. Dudley
INVENTOR.
BY Clarence A. O'Brien
and Harvey B. Jacobson
Attorneys July 29, 1969 V. E. DUDLEY 3,458,045
CENTRIFUGAL PELLET DRIER
Filed Aug. 26, 1966 4 Sheets-Sheet 3

Vernon E. Dudley
INVENTOR.

BY *Clarence A. O'Brien*
*and Harvey B. Jacobson*
Attorneys

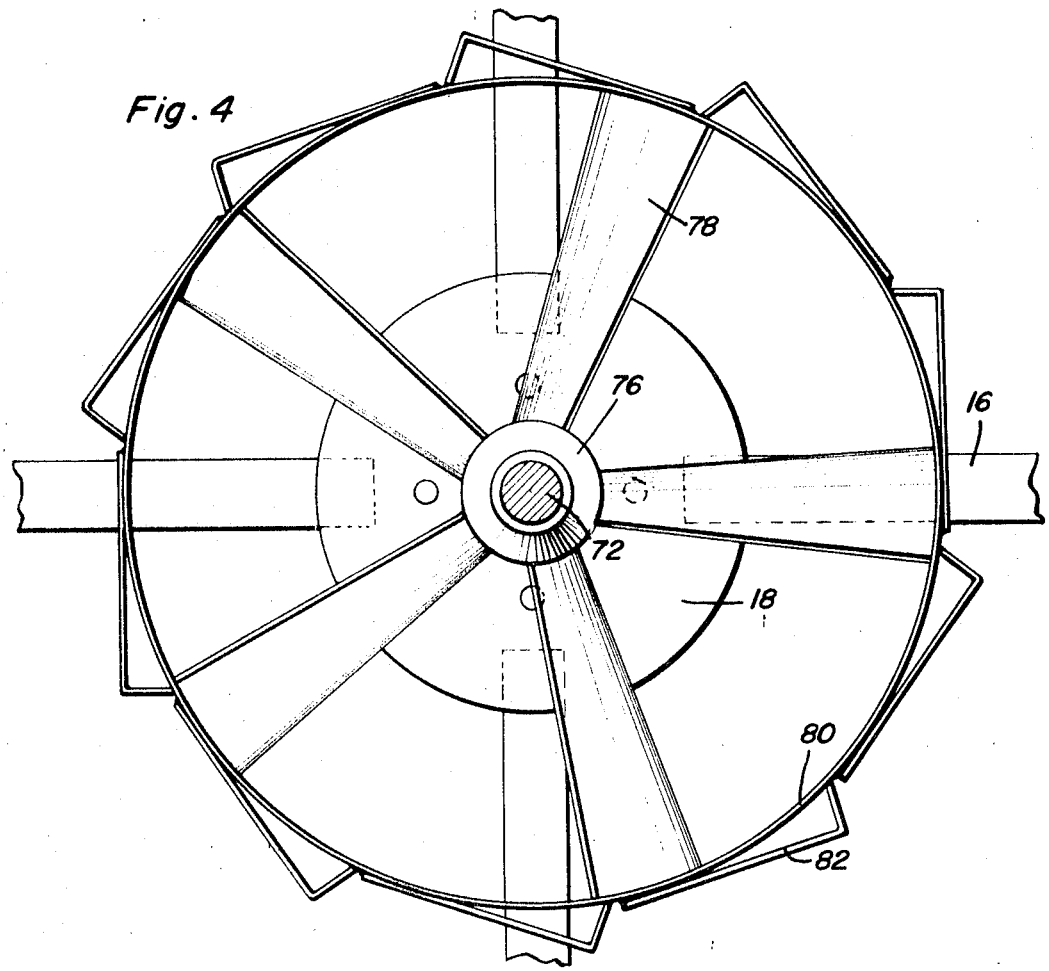
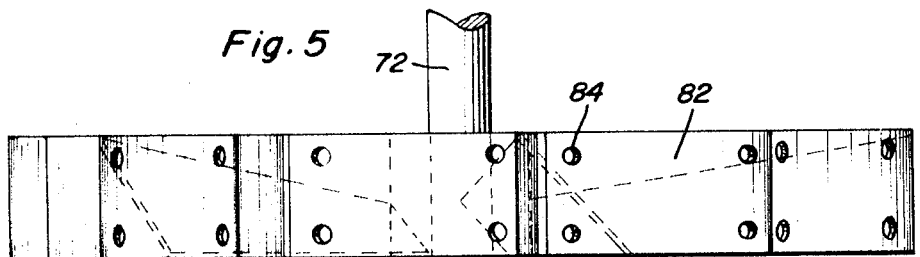
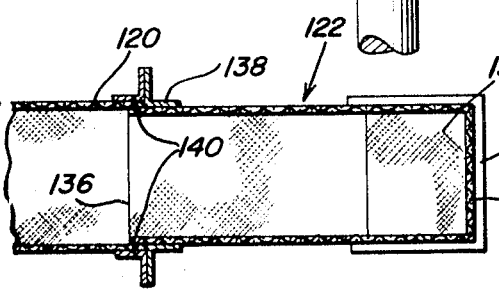

United States Patent Office 3,458,045
Patented July 29, 1969

3,458,045
CENTRIFUGAL PELLET DRIER
Vernon E. Dudley, Scott Depot, W. Va., assignor to Gala Industries, Inc., a corporation of Virginia
Filed Aug. 26, 1966, Ser. No. 575,418
Int. Cl. B01d 35/22, 35/16
U.S. Cl. 210—95                21 Claims

ABSTRACT OF THE DISCLOSURE

A solid-liquid separator in which a slurry is introduced through a dewatering conduit to the lower end of a vertical chamber having an outer foraminous wall through which liquid flows as the slurry is displaced upwardly through the chamber by a bladed rotor assembly. Solids are discharged at the upper end of the chamber while liquid is collected within an annular trough below the chamber.

---

This invention relates to apparatus for separating solids such as plastic pellets, from fluids or liquids mixed therewith to form a slurry. More particularly, the present invention is concerned with improvements in a centrifugal type of pellet separator or drier.

The improvements of the present invention relate to centrifugal separators wherein a solid-water slurry is fed to the lower end of a turbine bladed rotor enclosed by a vertical, foraminous chamber so that the solids are conveyed in a spiral path upwardly to a discharge chute during which the water is centrifugally discharged through the foraminous wall of the chamber. Machines of this type have been in use for some time in connection with the drying of washed grain and has more recently been adapted to the drying of plastic pellets. It is therefore a primary object of the present invention to provide such a machine embodying several improvements which make it particularly suitable for pellet drying purposes in a novel and efficient manner.

In accordance with the foregoing object, an additional object of the present invention is to provide a pellet drying apparatus featuring a novel, balanced rotor construction and supporting frame assembly which avoids loading of the housing to provide for a more rigid and stabilized support of the machine.

An additional important object of the present invention is to provide a pellet drying separator having a dewatering inlet conduit through which a pellet containing slurry is initially dewatered prior to introduction to the lower end of the vertical cylindrical chamber within which the pellets are separated from the water by the turbine bladed rotor assembly.

A further object of the present invention is to provide an improved type of pellet drying separator featuring a tangential outlet chute through which the dried pellets are discharged and an inlet chute arranged which avoids the use of a water dam employed in prior machines to more effectively utilize a foraminous bottom wall of the vertical chamber within which water is centrifugally separated from the pellets. Also, the arrangement of the present invention includes the mounting of an air outlet on the top of the housing to thereby avoid collection of fines in the outlet as well as to reduce the amount of floor space required for the apparatus.

Yet another object of the present invention is to provide an improved type of pellet drying separator wherein facilities are provided for collecting solids entering the inlet chute which exceed a size capable of damaging the machine as well as facilities for inspecting and removing flow blocking debris that may collect within the inlet chute.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the pellet drying separator of the present invention.

FIGURE 2 is a front elevational view of the apparatus shown in FIGURE 1 with parts broken away and shown in section.

FIGURE 4 is an enlarged partial sectional view as viewed from section line 4—4 in FIGURE 3 showing the rotor spider construction.

FIGURE 5 is a side elevational view of the spider construction shown in FIGURE 4.

FIGURE 6 is a partial transverse sectional view taken substantially through a plane indicated by section line 6—6 in FIGURE 1.

FIGURE 7 is a partial side elevational view of a portion of the machine as viewed from section line 7—7 in FIGURE 1.

FIGURE 8 is a partial front elevational view of the upper portion of the apparatus as shown in FIGURE 2.

FIGURE 10 is an enlarged partial sectional view taken substantially through a plane indicated by section line 10—10 in FIGURE 1.

FIGURE 12 is a partial sectional view taken substantially through a plane indicated by section line 12—12 in FIGURE 7.

FIGURE 13 is a partial sectional view taken substantially through a plane indicated by section line 13—13 in FIGURE 2.

Figure 3:
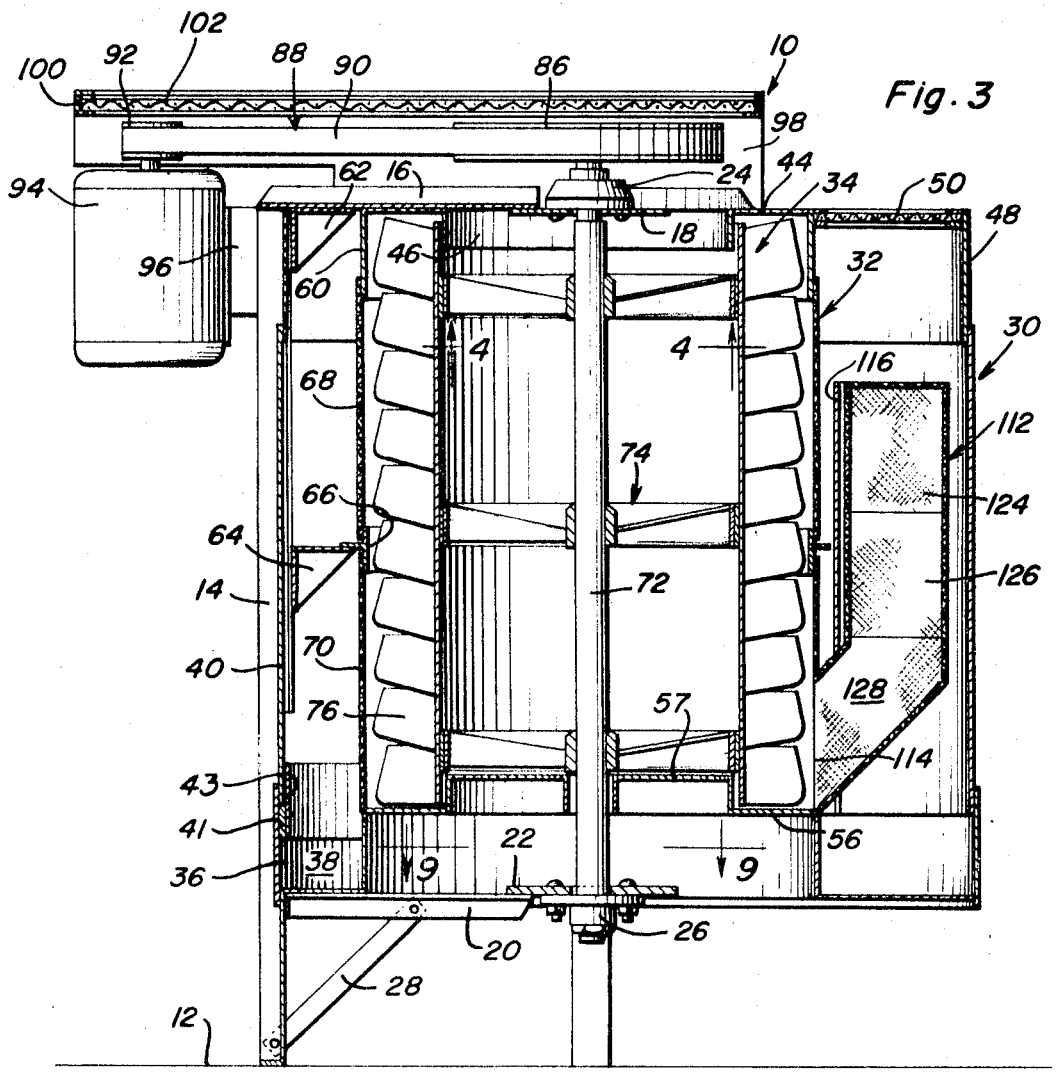
FIGURE 3 is a longitudinal side sectional view taken substantially through a plane indicated by section line 3—3 in FIGURE 1.
Figure 9:
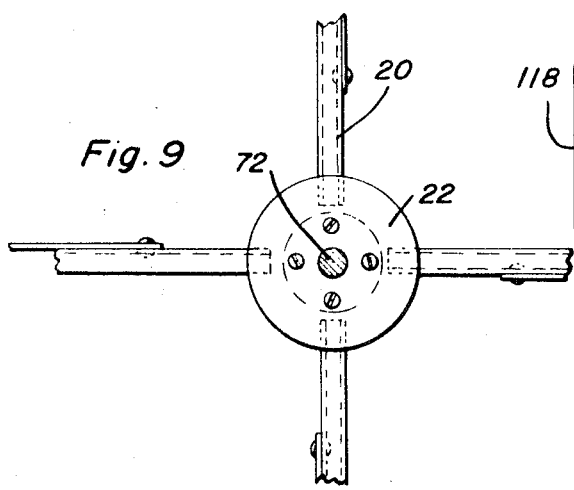
FIGURE 9 is a partial sectional view taken substantially through a plane indicated by section line 9—9 in FIGURE 3.

Referring now to the drawings in detail, and initially to FIGURES 1, 2 and 3, it will be observed that the pellet drying apparatus generally denoted by reference numeral 10 is supported on a horizontal surface or floor 12 by means of four vertical posts 14 which are interconnected at vertically spaced locations to form a rigid frame assembly. Thus, the upper ends of the vertical posts 14 which are shown to be channel shaped in cross-section, are connected to the radially outer ends of channel shaped bearing supports 16, the radially inner ends of which are interconnected by a bearing support plate 18. Similarly, the radially outer ends of channel shaped, bearing support members 20 are connected to the vertical posts 14 spaced above the floor 12 while the radially inner ends thereof are interconnected by a lower bearing support plate 22. The vertical posts 14 and the bearing support members 16 and 20 interconnected therewith are preferably spaced by equal angular distances about a substantially vertical, rotational axis established by the upper and lower journal assemblies 24 and 26 respectively mounted by the bearing support plates 18 and 22. Leg bracing elements 28 also interconnect the lower bearing support members 20 and the vertical posts 14 in order to further rigidify the frame assembly which supports an outer, imperforate housing 30, an inner foraminous enclosure 32 forming a vertical cylindrical chamber and a turbine bladed rotor assembly 34 enclosed within the vertical chamber.

The outer housing 30 includes a lower section 36 which is supported on the bearing support members 20 between the vertical posts 14 and forms an annular trough 38 for collecting water, the trough being spaced radially outward of and below the vertical chamber within which the rotor assembly 34 is confined by the foraminous enclosure 32. A vertically elongated intermediate section 40 is removably supported on the spacer 41 connecting the splash shield 43 to the section 36. The section 40 extends upwardly from the lower section 36 and the splash shield so arranged as to prevent escape of water from the vertical walls of the housing 30. An upper section 42 is connected to the intermediate section and has a top wall 44 provided with a downwardly extending, radially inner skirt 46 as shown in FIGURE 3 forming an opening within which the upper bearing plate 18 is disposed. The sections of the outer housing 30 also include a radially projecting portion 48. An air outlet filter 50 is mounted on the top wall of the radially projecting portion 48 in spaced relation to an inlet feed chute 52. This top mounting of the inlet provides for better access through the top wall. Also extending horizontally from the projecting portion 48 of the housing, is an inspection window device 54 aligned with the feed chute 52 as shown in FIGURE 1. Thus, it will be apparent that the slurry of pellets and water is introduced into the machine through the feed chute 52 of the apparatus when operating. Water separated from the slurry may drain into the bottom of the vertical chamber closed by an annualar end wall 56 as shown in FIGURE 3, which is connected between the imperforate bottom member 57 and the annular trough 38 within which water is collected. The lower section 36 of the enclosure within which the trough 38 is formed, is therefore also provided with an outlet 58 as shown in FIGURE 2.

The foraminous enclosure 32 includes an upper annular section 60 secured as by welding to the top wall 44 of the outer housing which is braced by angularly spaced corner braces 62 as shown in FIGURE 3. Angularly spaced corner braces 64 are also secured to the intermediate section 40 of the outer housing in order to support an annular member 66 in radially spaced relation to the outer housing, vertically spaced below the upper annular section 60. A cylindrical screen wall 68 is interconnected between the annular sections 60 and 66 while a lower annular screen wall 70 is supported by the intermediate annular section 66 and extends downwardly therefrom to the bottom wall 56. Thus, it will become apparent that the foraminous enclosure 32 will confine upward movement of the solids therewithin but will permit water to be discharged through the screen walls 70 and 68 for collection within the annular trough 38 within the lower section of the outer housing.

As shown in FIGURE 3, the rotor assembly 34 is supported within the vertical chamber enclosed by the foraminous enclosure 32 by means of the spaced journal assemblies 24 and 26 which rotatably mount the vertical shaft 72 at its lower end and adjacent its upper end. The shaft 72 is connected to a plurality of spider assemblies 74 by means of which the turbine blades 76 are mounted for rotation with the shaft 72 within a radially outer portion of the vertical chamber. The constructional details of the turbine blade structure itself are of any suitable, well-known type the details of which form no part of the present invention. For the purposes of the present invention however it suffices to say that the turbine blade arrangement is such as to upwardly convey the solids within the slurry in a spiral path by means of centrifugal action which causes the water within the slurry to be discharged from the annular screen walls 68 and 70 of the foraminous enclosure 32. The turbine blades are however supported for rotation with the shaft by means of the vertically spaced spider constructions 74, the details of which are more clearly shown in FIGURES 4 and 5. FIGURES 4 and 5 therefore show each spider construction as including a hub portion 76 to which the shaft 72 is keyed, a plurality of equally spaced and angularly disposed spoke blade elements 78 being connected to the hub portion 76 for support of a circular mounting rim 80 in concentric relation to the shaft 72. A plurality of blade mounting elements 82 are welded in tangential relation to the rim 80 and are provided with a plurality of apertures 84 through which the turbine blades are secured to the spider construction. The spider constructions 74 therefore provide a more easily assembled and well balanced rotor assembly.

The upper end of the rotor shaft 72 extends through the upper journal assembly 24 and is connected to the pulley wheel 86 of a motor operated drive assembly 88 as more clearly seen in FIGURE 3. The drive assembly 88 also includes an endless drive belt 90 entrained about the driven pulley wheel 86 and about a drive pulley 92 driven by an electric motor 94 suitably supported on the outer housing by means of a support bracket 96 for example. The drive assembly is protectively enclosed by a guard 98 which mounts a rectangular, angle iron frame 100 as more clearly seen in FIGURES 1 and 6 in order to form a top opening receiving a conventional type of air filter 102. During operation of the drive assembly upon energization of the motor 94, air will be drawn into the center of the rotor assembly 34 through the filter 102 by virtue of the rotation of the angularly disposed spoke blades 78 of the spider constructions 74. The air is thus discharged into the radially outer portions of the outer housing 30 through the foraminous enclosure 32 enhancing the outflow of water. While the water under the influence of gravity is collected within the trough 38, the air is discharged through the filter 50 located on top of the outer housing so as to avoid collection of fines as well as to avoid the additional space needed for any horizontal type of air discharge duct. The solids or pellets on the other hand are centrifugally discharged through a discharge duct 104 adjacent the upper end of the enclosure 32 as more clearly seen in FIGURE 1, 7 and 12.

The discharge duct 104 is tangentially connected to the upper annular section 60 of the foraminous enclosure as shown in FIGURE 12 so that maximum advantage is obtained from the centrifugal forces acting on the pellets being conveyed upwardly in a spiral path by means of the turbine blades 76. This arrangement also does not interfere with the braces 62 and prevents collection of resin at the top. The discharge duct 104 therefore extends tangentially from the foraminous enclosure adjacent the upper end thereof and projects through the upper section 42 of the outer housing in order to deposit the pellets externally of the outer housing. Thus, as shown in FIGURE 7, the portion of the discharge duct externally of the housing curves downwardly toward an outlet 106. The exposed lateral side of the discharge duct outside of the housing may also be provided with an opening closed by a removable, transparent inspection window 108 slidably mounted by the angle bars 110 secured to the side wall of the duct. The operator may thereby inspect the duct and remove any obstructions therein.

As hereinbefore indicated, the slurry is introduced into the vertical chamber enclosed by the foraminous enclosure 32 at the lower end immediately above the bottom screen 56. Prior to introducing the slurry at this location to the vertical chamber, it is initially dewatered by flow through a dewatering conduit 112 made of foraminous material as more clearly seen in FIGURES 2 and 3 from which water is discharged through the conduit walls by separating forces during flow of the slurry therethrough. The dewatering conduit assembly therefore establishes a direction changing flow path for the slurry between the inlet feeed chute 52 and the inlet opening 114 at the lower end of the vertical chamber enclosed by the foraminous enclosure 32. The dewatering conduit therefore is enclosed within the projecting portion 48 of the housing and is protected from water splashings by the shield 116. The dewatering conduit includes an upper duct section 118 which extends downwardly from the top wall 44 of the outer housing communicating with the inlet feed chute 52 and is provided with an angularly extending portion 120 to which a removable duct section 122 is connected. The removable duct section 122 is therefore connected adjacent its lower end to the portion 124 of the duct section 126 having a lower angularly extending portion 128 connected to the annular screen wall 70 of the foraminous enclosure about the inlet opening 114. As more clearly seen in FIGURE 13, the removable duct section 122 is received within the upper support bracket 130 for the duct section 126 and is provided with an outlet opening 132 adjacent to the end wall 134 opposite the opened end 136 received within the portion 120 of the duct section 118. The removable duct 122 may therefore be provided with angle elements 138 which abut the angle elements 140 on the portion 120 of the upper duct section in order to facilitate removal and replacement of the removable duct between the vertically spaced fixed duct sections 118 and 126 of the dewatering conduits for cleaning purposes. It will also be apparent that because of the directionally changing nature of the flow path established by the dewatering conduit, substantial separation occurs between the solids and the water within the slurry as it enters the inlet opening 114 so that a substantial quantity of separated water may be discharged from the bottom section 36 without any dam elements or obstruction of flow.

Figure 11:
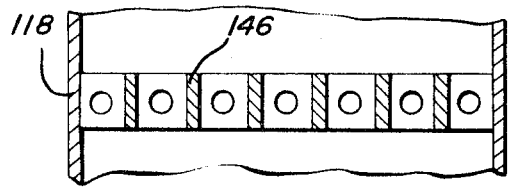
FIGURE 11 is an enlarged partial sectional view taken substantially through a plane indicated by section line 11—11 in FIGURE 10.

In order to prevent damage to the apparatus by solids of an excessive size, the upper duct section 118 of the dewatering conduit is provided with a grate device 142 as shown in FIGURES 10 and 11. The grate device includes a collection plate 144 which extends across a portion of the flow path of the duct section 118 and is angled downwardly. Extending upwardly at an angle to the collection plate 144 and connected between the collection plate and the opposite wall of the duct 118, are a plurality of horizontally spaced sizing bars 146. The sizing bars 146 extend across the major portion of the flow area enclosed by the duct 118 so as to prevent passage of solids 148 which exceed in size the spacing between the sizing bars. Since the sizing bars 146 and the collection plate 144 converge downwardly toward each other, the solids 148 will collect on the collection plate 144 as shown in FIGURE 10. The collection plate extends upwardly from its intersection with the sizing bars toward an opening 150 formed in the inspection window device 54. Accordingly, the transparent window element 152 may be slidably mounted for vertical removal in order to permit the operator to remove the solids 148 through the opening 150. The inspection window device 54 therefore permits both inspection of the inlet duct and removal of solids therefrom should it become clogged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for separating solids from fluids comprising, a frame assembly, a rotor rotatably mounted by the frame assembly about a substantially vertical axis, foraminous wall means enclosing a vertical chamber about said rotor, turbine blades mounted by said rotor within said chamber for displacing solids and fluids upwardly and radially outwardly from said vertical axis, an imperforate enclosure supported by the frame assembly and mounting the foraminous wall means therein, said enclosure having a fluid collection trough radially spaced outwardly from the vertical chamber and below the turbine blades and a top wall closing the vertical chamber at an upper end thereof, a solids discharge chute connected to the foraminous wall means adjacent to said upper end of the vertical chamber and inlet means connected to the foraminous wall means at a lower end above the collection trough.

2. The combination of claim 1 wherein said lower end of the vertical chamber is closed by an annular end wall connected to the foraminous wall means at said lower end above the collection trough.

3. The combination of claim 2 including power operated drive means mounted above the top wall and connected to the rotor, a protective guard enclosing said drive means and removable filter means mounted by the guard.

4. The combination of claim 1 wherein said inlet means comprises a feed chute projecting above the top wall of the enclosure and foraminous conduit means mounted within the enclosure for establishing a direction changing flow path between the feed chute and the wall means of the vertical member at the lower end thereof.

5. The combination of claim 1 wherein said rotor includes a shaft, a plurality of angularly disposed fan blades connected to the shaft, a circular rim mounted by the blades in concentric relation to the shaft and a plurality of holders secured to the rim extending tangentially therefrom on which the turbine blades are mounted.

6. The combination of claim 1 including, a splash shield surrounding the vertical chamber adjacent a lower end thereof, and spacer means connecting the shield to the collection trough, said imperforate enclosure being supported on said spacer means between the trough and the splash shield in encircling relation to the foraminous wall means.

7. Apparatus for separating solids from fluids comprising, a frame assembly, a rotor rotatably mounted by the frame assembly about a substantially vertical axis, foraminous annular wall means enclosing a vertical chamber about said rotor, turbine means mounted by said rotor within said chamber for displacing solids and fluids upwardly and radially outwardly from said vertical axis, an imperforate enclosure supported by the frame assembly and mounting the foraminous wall means therein, said enclosure having a fluid collection trough radially spaced outwardly from and below the vertical chamber and the turbine means and a top wall closing the vertical chamber at an upper end thereof, a solids discharge chute connected to the foraminous wall means adjacent to said upper end of the vertical chamber and inlet means connected to the foraminous wall means at a lower end thereof, said inlet means comprising foraminous conduit means connected between said lower end of the vertical chamber and said top wall of the enclosure for establishing a direction changing flow path within the enclosure, and grate means mounted within the foraminous conduit means adjacent said top wall for preventing flow of solids into the chamber exceeding a predetermined size.

8. The combination of claim 7 wherein said lower end of the vertical chamber is closed by an annular end wall connected to the foraminous wall means above the collection trough.

9. The combination of claim 8 wherein said foraminous conduit means includes a pair of vertically spaced ducts connected respectively to the wall means at the lower end of the chamber and to the top wall of the enclosure, and a removable conduit section interconnecting said ducts and extending at an angle thereto.

10. The combination of claim 9 wherein said grate means includes a collection plate mounted within one of said ducts at a downward angle partially blocking the flow path therein and a plurality of horizontally spaced sizing bars converging downwardly toward the plate across the remainder of the flow path.

11. The combination of claim 10 wherein said one of the ducts includes removable window means externally of the enclosure, said collection plate extending toward the window means for removal of solids collected thereon through an opening in the duct closed by said window means.

12. The combination of claim 11 including air exhaust means mounted by said top wall of the enclosure.

13. The combination of claim 12 including power operated drive means mounted above the top wall and connected to the rotor, a protective guard enclosing said drive means and removable filter means mounted by the guard.

14. The combination of claim 7 wherein said foraminous conduit means includes a pair of vertically spaced ducts connected respectively to the wall means at the lower end of the chamber and to the top wall of the enclosure, and a removable conduit section interconnecting said ducts and extending at an angle thereto.

15. The combination of claim 14 wherein said grate means includes a collection plate mounted within one of said ducts at a downward angle partially blocking the flow path therein and a plurality of horizontally spaced sizing bars converging downwardly toward the plate across the remainder of the flow path.

16. The combination of claim 15 wherein said one of the ducts includes removable window means externally of the enclosure, said collection plate extending toward the window means for removal of solids collected thereon through an opening in the duct closed by said window means.

17. Apparatus for separating solids from fluids comprising, a frame assembly, a rotor rotatably mounted by the frame assembly about a substantially vertical axis, foraminous wall means enclosing a verical chamber about said rotor, turbine means mounted by said rotor within said chamber for displacing solids and fluids upwardly and radially outwardly from said vertical axis, an imperforate enclosure supported by the frame assembly and mounting the foraminous wall means therein, a feed chute projecting above the enclosure and foraminous dewatering conduit means mounted within the enclosure for establishing a direction changing flow path between the feed chute and the wall means of the vertical chamber at the lower end thereof.

18. The combination of claim 17 wherein said dewatering conduit means includes a pair of vertically spaced ducts connected respectively to the wall means at the lower end of the chamber and to the enclosure, and a foraminous conduit section interconnecting said ducts and extending at an angle thereto.

19. The combination of claim 18 including a collection plate mounted within one of said ducts at a downward angle partially blocking the flow path therein and a plurality of horizontally spaced sizing bars converging downwardly toward the plate across the remainder of the flow path.

20. The combination of claim 19 wherein said one of the ducts includes removable window means externally of the enclosure, said collection plate extending toward the window means for removal of solids collected thereon through an opening in the duct closed by said window means.

21. The combination of claim 17 including power operated drive means mounted above the imperforate enclosure and connected to the rotor, a protective guard enclosing said drive means and removable filter means mounted by the guard.

References Cited
UNITED STATES PATENTS

| | | | |
|---|---|---|---|
| 310,469 | 1/1885 | Schlatter | 210—415 X |
| 584,195 | 6/1897 | Robinson et al. | 210—415 |
| 2,478,651 | 8/1949 | Blachere | 210—415 X |
| 2,902,156 | 9/1959 | Dahlberg | 210—414 X |
| 3,258,895 | 7/1966 | Wiebe et al. | 55—452 X |

REUBEN FRIEDMAN, Primary Examiner

JOHN ADEE, Assistant Examiner

U.S. Cl. X.R.

210—316, 415